United States Patent

Alberth, Jr. et al.

Patent Number: 6,021,332
Date of Patent: Feb. 1, 2000

[54] MULTI-MODE RADIOTELEPHONE HAVING A MULTIPLE BATTERY ARRANGEMENT

[75] Inventors: William P. Alberth, Jr., Crystal Lake; Joan E. Zocher, Spring Grove; Michael W. Frenzer, Palatine, all of Ill.

[73] Assignee: Motorola, Inc., Schaumburg, Ill.

[21] Appl. No.: 08/831,362

[22] Filed: Apr. 1, 1997

[51] Int. Cl.$^7$ .................................................. H04Q 7/32
[52] U.S. Cl. ............................... 455/552; 320/5; 320/111; 340/636
[58] Field of Search ............................... 455/552; 320/5, 320/106, 111; 340/636

[56] References Cited

U.S. PATENT DOCUMENTS

| | | | |
|---|---|---|---|
| 5,036,532 | 7/1991 | Metroka et al. | 455/127 |
| 5,489,834 | 2/1996 | Pitkanen | 320/15 |
| 5,535,432 | 7/1996 | Dent | 455/77 |
| 5,684,384 | 11/1997 | Barkat et al. | 320/6 |
| 5,717,307 | 2/1998 | Barkat et al. | 320/5 |
| 5,732,359 | 3/1998 | Baranowsky, II et al. | 455/552 |

FOREIGN PATENT DOCUMENTS

| | | | |
|---|---|---|---|
| 63-224422 | 9/1988 | Japan | H04B 7/26 |
| 2314 483 | 12/1997 | United Kingdom | H04Q 7/32 |

*Primary Examiner*—Dwayne D. Bost
*Assistant Examiner*—Alan T. Gantt
*Attorney, Agent, or Firm*—John G. Rauch; Lalita P. Williams

[57] ABSTRACT

A radiotelephone (100) includes a main battery (101) and is operable on a first communication system. A supplemental module (102) may be attached to the radiotelephone. The supplemental module may include a second RF communication circuit for communicating with a second communication system. This allows the user to configure the radiotelephone for communication with currently available systems. The supplemental module may further include an auxiliary battery for providing extended battery operation. The radiotelephone includes a discharging and charging circuit (310) to control the discharge and charge of the auxiliary and main batteries in a way that allows uninterrupted, continuous operation of the radiotelephone.

3 Claims, 10 Drawing Sheets

MULTI-MODE RADIOTELEPHONE HAVING A MULTIPLE BATTERY ARRANGEMENT

CROSS REFERENCE TO RELATED APPLICATIONS

The present application is related to U.S. Pat. No. 5,084,384, entitled "Apparatus and Method For Discharging A Multiple Battery Arrangement," filed on Oct. 31, 1995 and assigned to the assignee of the present invention, and to application Ser. No. 08/295,562 abandoned May 28, 1996, entitled "Radiotelephone Handset Accommodating Multiple Removable Protocol Modules," filed on Aug. 25, 1994 and assigned to the assignee of the present invention.

FIELD OF THE INVENTION

The present invention relates generally to communication devices and more specifically relates to a communication device which accepts a supplemental module to provide a multiple battery arrangement or a second radio frequency communication circuit.

DESCRIPTION OF THE RELATED ART

Modern radiotelephones have been limited in their applications by the need for a charged battery for operation. Battery-powered portable radiotelephones have become increasingly popular due to their light weight and compactness. These devices, such as cellular radiotelephones and cordless radiotelephones, are typically equipped with only a single main battery and, thus, their operational time is short. Also, the operation of devices must be interrupted to replace the single main battery. Such interruptions can come at undesirable times, such as during a telephone call, and lead to undesirable results, such as a dropped call.

In response to these shortcomings, some portable radiotelephones have been equipped with an auxiliary battery. These portable radiotelephones automatically switch between the main and auxiliary batteries to avoid interruption in operation. For example, as the main battery becomes depleted, the device switches to the auxiliary battery.

In addition to the requirement for extended battery operation, modern radiotelephones are limited by being operable on only a single communication system. Such systems include terrestrial systems, such as systems according to the Global System for Mobile communications (GSM), systems according to the North American Digital Cellular system (NADC) and systems according to code divisional multiple access (CDMA) standards. Such systems also include satellite systems, such as the IRIDIUM satellite communication system.

The proliferation of communication systems, each having limited coverage areas, has increased the desirability of having a multi-mode radiotelephone operable on each system. Because access to all systems may not be desirable and may not be economically feasible, there is a need for a radiotelephone which can selectively access particular systems as required. This is particularly true in remote areas where coverage on any one particular system is likely to be unreliable. It is in just such remote areas that extended battery operation is most important.

What is needed therefore is an economical radiotelephone and method for controlling a multiple battery arrangement in a manner that allows for uninterrupted continuous operation of a radiotelephone and which accommodates communication with a variety of communication systems.

DETAILED DESCRIPTION OF THE PREFERRED EMBODIMENT

Figure 1:
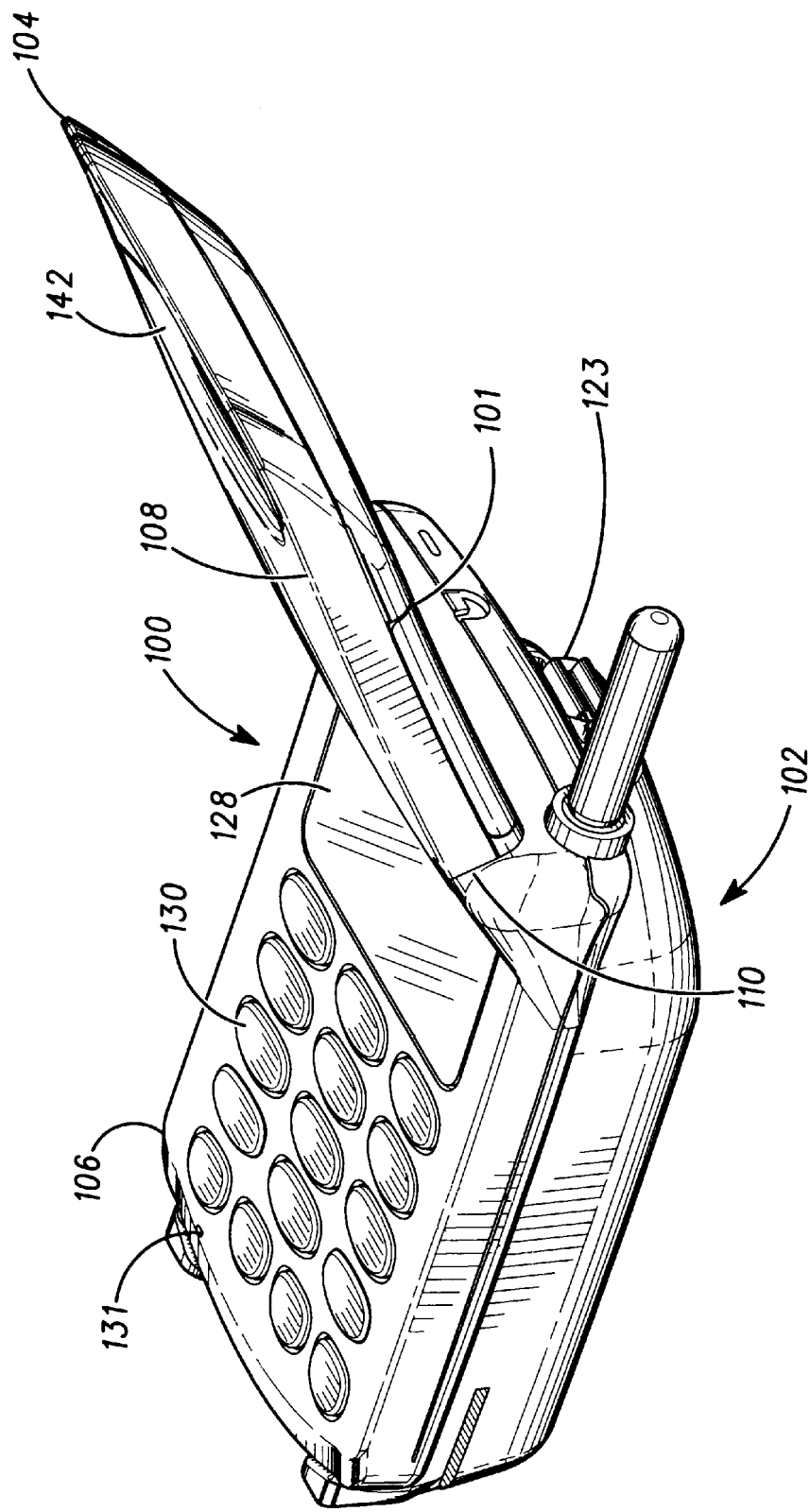
FIG. 1 is a radiotelephone in accordance with the present invention.

FIG. 1 illustrates a radiotelephone 100 having a main battery 101 and an supplemental module 102. The radiotelephone 100 includes a housing 104 having a lower housing portion 106 and an upper housing portion 108 rotatably coupled via a hinge 110. The lower housing portion 106 includes a retaining slot 123 for attaching the supplemental module 102, a display 128, a keypad 130, and a microphone opening 131. The display 128 provides visual information to a user including, for example, the current amount of charge remaining in the main battery 101 or the supplemental module 102. The keypad 130 allows the user to power on and off the radiotelephone 100 and initiate calls by keying keys of the keypad. A microphone is concealed behind the microphone opening 131. The housing portion 108 includes a speaker bezel 142 having openings. A speaker is positioned behind the speaker bezel 142. In addition to providing audio to the user during a call, the speaker may provide an audible alert when the main battery 101 and the auxiliary battery near depletion. The lower and upper housing portions 106, 108 include the auxiliary battery and the main battery 101 attached thereto. The main battery 101 and the supplemental module 102 are detachable from the radiotelephone 100 as exemplified by FIG. 2.

Figure 2:
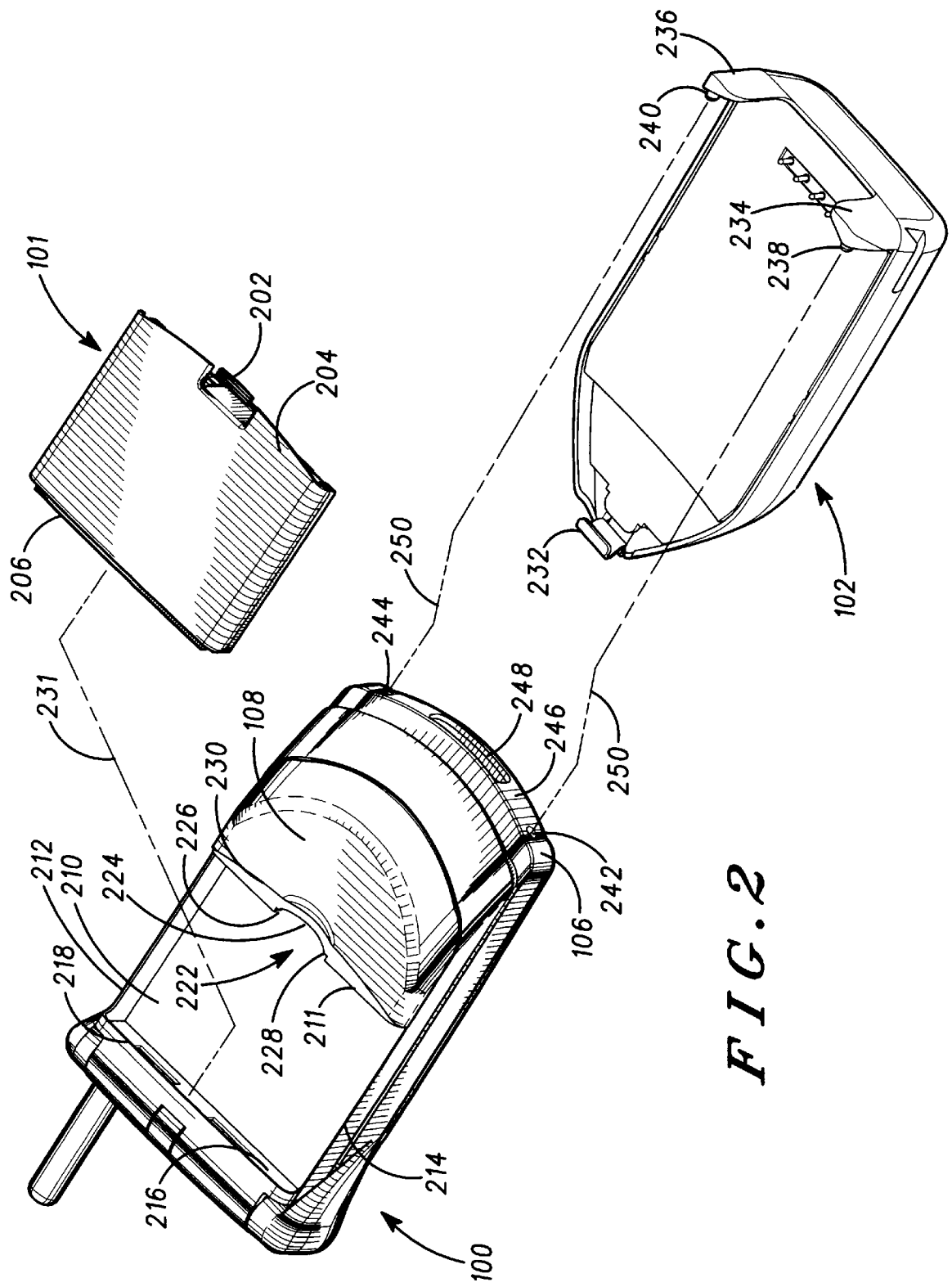
FIG. 2 is a second view of the radiotelephone of FIG. 1.

FIG. 2 illustrates the radiotelephone 100 in a closed position with the main battery 101 and the supplemental module 102 detached therefrom. The main battery 101 includes a latch member 202 disposed about a midpoint of a flange 204 that forms a first end of the main battery 101. A protrusion 206 is longitudinally disposed on a second end of the main battery 101 opposite the latch member 202. The radiotelephone 100 includes a first recess 210 formed in the upper housing portion 108. The first recess 210 is formed of a front wall 211, a right wall 212, a left wall 214, and a rear wall 216. A lip 218 extends outward from the rear wall 216 and over the first recess 210. A mating latch member 222 includes shoulders 226, 228 and comprises a cutaway area 224 of the front wall 211. A second recess 230 of the upper housing portion 108 extends forward from, and above, the front wall 211. The main battery 101 is attached to the device by inserting the protrusion 206 of the main battery 101 beneath the lip 218 as shown by imaginary line 231 and rotating the main battery 101 downward into the first recess 210. The main battery 101 is rotated until the latch member 202 engages the shoulders 226, 228 of the mating latch member 222 and the flange 204 rests in the second recess 230. The main battery 101 is detached by depressing the latch member 202 away from the shoulders 226, 228 and rotating the main battery 101 upward and away from the first and second recesses 210, 230.

The supplemental module 102 includes a flexible hook latch 232 and fixed supports 234, 236 with posts 238, 240, respectively. The radiotelephone 100 includes a retaining slot 123 of FIG. 1 and receptacles 242, 244 disposed on an end 246 of the lower housing portion 106 for attaching the supplemental module 102. The radiotelephone 100 includes an elongated opening 248 disposed on a bottom end 246 of the lower housing portion 106 between the receptacles 242, 244. The elongated opening 248 provides access to a coupler 314 (see FIG. 3) disposed therein. The supplemental module 102 is attached by inserting the flexible hook latch 232 into the retaining slot 123; angularly extending the supplemental module 102 downward until the fixed supports 234, 236 clear the bottom end 246; rotating the supplemental module 102 until juxtaposed with the lower housing portion 106; and releasing the supplemental module 102 thereby allowing the fixed supports 234, 236 to move towards the bottom end 246 allowing posts 238, 240 to insert into receptacles 242, 244 as telegraphed by lines 250. The spacing of the fixed supports 234, 236 prevents obstruction of the elongated opening 248 and preserves access to the coupler 314 when the supplemental module 102 is attached. The supplemental module 102 is detached from the radiotelephone 100 by substantially reversing the aforementioned steps of attachment.

In accordance with the present invention, the radiotelephone 100 comprises a first radio frequency (RF) communication circuit, the main battery 101, and the supplemental module 102. The supplemental module 102 comprises an auxiliary battery or a second RF communication circuit, or both.

To provide extended battery-powered operation, the supplemental module 102 in the form of an auxiliary battery is affixed to the radiotelephone 100. To avoid interruption in operation, the radiotelephone 100 automatically switches between the main battery 101 and the auxiliary battery of the supplemental module 102. For example, as the main battery 101 becomes depleted, the radiotelephone switches to the auxiliary battery.

To provide access to more than one communication system, a supplemental module 102 in the form of second RF circuit is affixed to the radiotelephone 100. The radiotelephone 100 includes the first RF circuit within the housing 104, as will be described in further detail below. When the supplemental module 102 including the second RF circuit is attached to the housing 104, the radiotelephone 100 may communicate with more than one remote transceiver or communicate with more than one communication system.

Exemplary embodiments include a first RF communication circuit configured for radio communication with a satellite communication system and a second RF communication circuit configured for radio communication with a terrestrial communication system, or a first RF communication circuit configured for radio communication with a first terrestrial communication system and a second RF communication circuit configured for radio communication with a second terrestrial communication system. In the illustrated embodiment, both RF communication circuits are configured for two-way radio communication, but in alternative embodiments, one or both may be configured for one-way communication, such as a pager.

Figure 9:
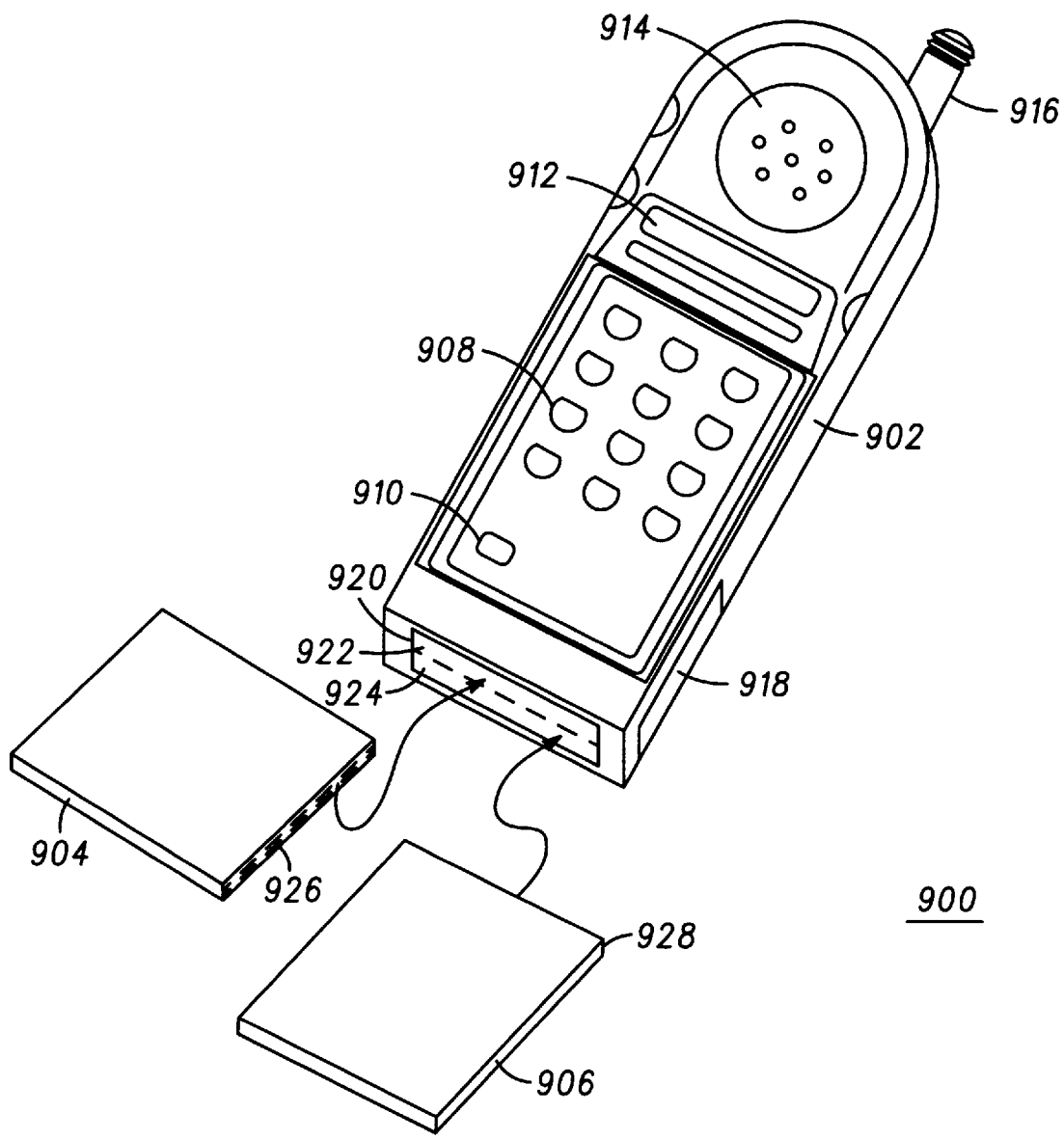
FIG. 9 is an alternative embodiment of a radiotelephone in accordance with the present invention.

FIG. 9 is an alternative embodiment of a radiotelephone 900 in accordance with the present invention. The radiotelephone 900 includes a housing 902, a first module 904 and a second module 906. The housing 902 includes a keypad 908, a power key 910, a display 912, a speaker 914, an antenna 916 and a main battery 918 for powering the radiotelephone 900. A control circuit is disposed within the housing 902 for controlling the radiotelephone 900.

The housing 902 defines an aperture 920 including a first slot 922 and a second slot 924. The first module 904 and the second module 906 may be inserted in one of the first slot 922 or the second slot 924. The first module 904 includes a connector 926 and the second module 906 includes a connector 928 for making electrical contact with mating connectors disposed within the housing 902. The connector 926 and the connector 928 convey power, ground, control signals and radio frequency (RF) signals as is appropriate to the nature of each of the modules.

In a first embodiment, the radiotelephone 900 includes a primary radio frequency (RF) communication circuit for radio communication with a first remote transceiver disposed within the housing 902 and each of the first module 904 and the second module 906 forms a supplemental module comprising at least an auxiliary battery or a secondary RF communication circuit for radio communication with a second remote transceiver, Depending on user requirements, two auxiliary battery modules may be inserted or one auxiliary battery module and one RF communication circuit module may be inserted or two RF communication circuit modules may be inserted in the aperture 920. Thus, the capabilities of the radiotelephone 900 may be tailored to the user's needs.

In a second embodiment the radiotelephone 900 does not include a primary radio frequency (RF) communication circuit disposed within the housing 902. In this second embodiment, one of the first module 904 or second module 906 provides the primary radio frequency (RF) communication circuit The other module forms a supplemental module comprising an auxiliary battery or a secondary RF communication circuit for radio communication with a second remote transceiver. Depending on user requirements, an auxiliary battery module may be inserted in the aperture or a an RF communication module may be inserted. Again, this allows the capabilities of the radiotelephone 900 to be tailored to the user's needs.

Figure 3:
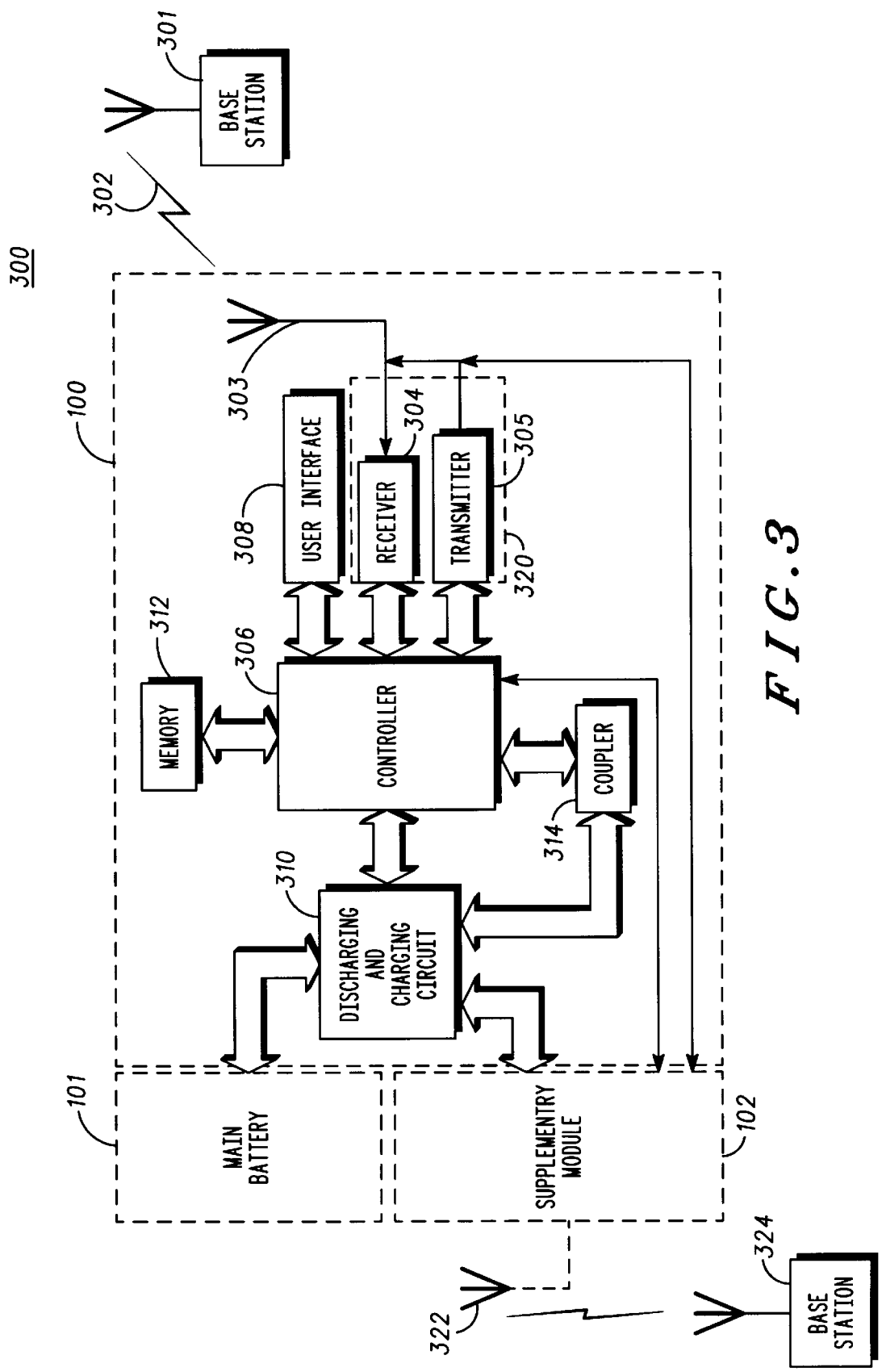
FIG. 3 is an illustration in block diagram form of a radio frequency communications system employing the radiotelephone of FIG. 1.

FIG. 3 is an illustration in block diagram form of a radio frequency communications system 300 wherein a base station 301 and the radiotelephone 100 communicate via radio frequency (RF) signals 302. The base station 301 forms a first remote transceiver. The radiotelephone 100 includes an antenna 303, a first radio frequency communication circuit 320 including a receiver 304 and a transmitter 305, a controller 306, and a user interface 308 that includes the speaker (not shown), the display 128 of FIG. 1, the microphone (not shown), and the keypad 130 of FIG. 1. The controller 306 could be, for example, a 68HC11 microprocessor available from Motorola, Inc. The controller 306 forms a control circuit for controlling operation of the radiotelephone 100. The radiotelephone 100 is powered by the detachable main battery 101. In addition, a supplemental module 102 may be attached to the radiotelephone 100 to provide an auxiliary battery or to provide a secondary communication circuit.

The antenna 303 transduces the RF signals 302 into electrical RF receive signals and couples the electrical RF receive signals to the receiver 304. The receiver 304 transforms the electrical RF receive signals into data receive signals that are then coupled through the controller 306 and output to the user as audible speech via the speaker and as operational information via the display 128. Speech and data input by the user via the microphone and the keypad 130, respectively, are coupled to the transmitter 305 as data transmit signals. The transmitter 305 converts the data transmit signals into electrical RF transmit signals which are transduced by the antenna 303 and transmitted as the RF signals 302.

The radiotelephone 100 includes a discharging and charging circuit 310, a memory 312, and a coupler 314. The discharging and charging circuit 310 selectively discharges the main battery 101 and an auxiliary battery included with the supplemental module 102 to supply uninterrupted power to the radiotelephone 100. The discharging and charging circuit 310 also selectively charges the main battery 101 and the auxiliary battery, if present, under the control of a program executed by the controller 306. The program is stored in the memory 312. The memory 312 is preferably a read-only memory (ROM), but could be an erasable programmable read-only memory (EPROM), a random-access memory (RAM), or other suitable memory device. Although the memory 312 is shown separate from the controller 306, it will be recognized that the memory 312 could be internal to the controller 306 and/or that the controller 306 may contain other memory in addition to memory 312. The coupler 314 permits a user to attach an external power supply 430 (see FIG. 4) thereto for providing power to operate the radiotelephone 100 (and save battery charge) or charge the main battery 101 and the auxiliary battery, if present.

The supplemental module 102 includes electrical connections suitable for operation as both an auxiliary battery or as a radio frequency communication circuit. Thus, the supplemental module 102 is configured to be coupled to the discharging and charging circuit 310 for discharging and charging an auxiliary battery and for providing operating power to a radio frequency communication circuit. The supplemental module 102 is further configured to be coupled to the controller 306 and to the antenna 303 for operation as a RF communication circuit for communicating with a second remote transceiver in addition to the base station 301.

In a typical application, the supplemental module 102 including a second RF communication circuit includes a receiver similar to receiver 304 and a transmitter similar to transmitter 305. The respective receiver and transmitter circuits, however, may be tailored to communication in a particular communication system, such as a particular satellite communication system or a particular terrestrial communication system. In addition, the supplemental module 102 may further include an antenna 322 for communication with the second remote transceiver, such as base station 324 or a satellite transceiver. In this configuration, the antenna 303 is a primary antenna coupled to the primary RF communication circuit and the antenna 322 is a secondary antenna coupled to the secondary communication circuit. The radiotelephone 100 including a first RF communication circuit and a second RF communication circuit is thus a multi-mode radiotelephone, operable in a first mode with the first RF communication circuit and operable in a second mode with the second RF communication circuit.

Figure 4:
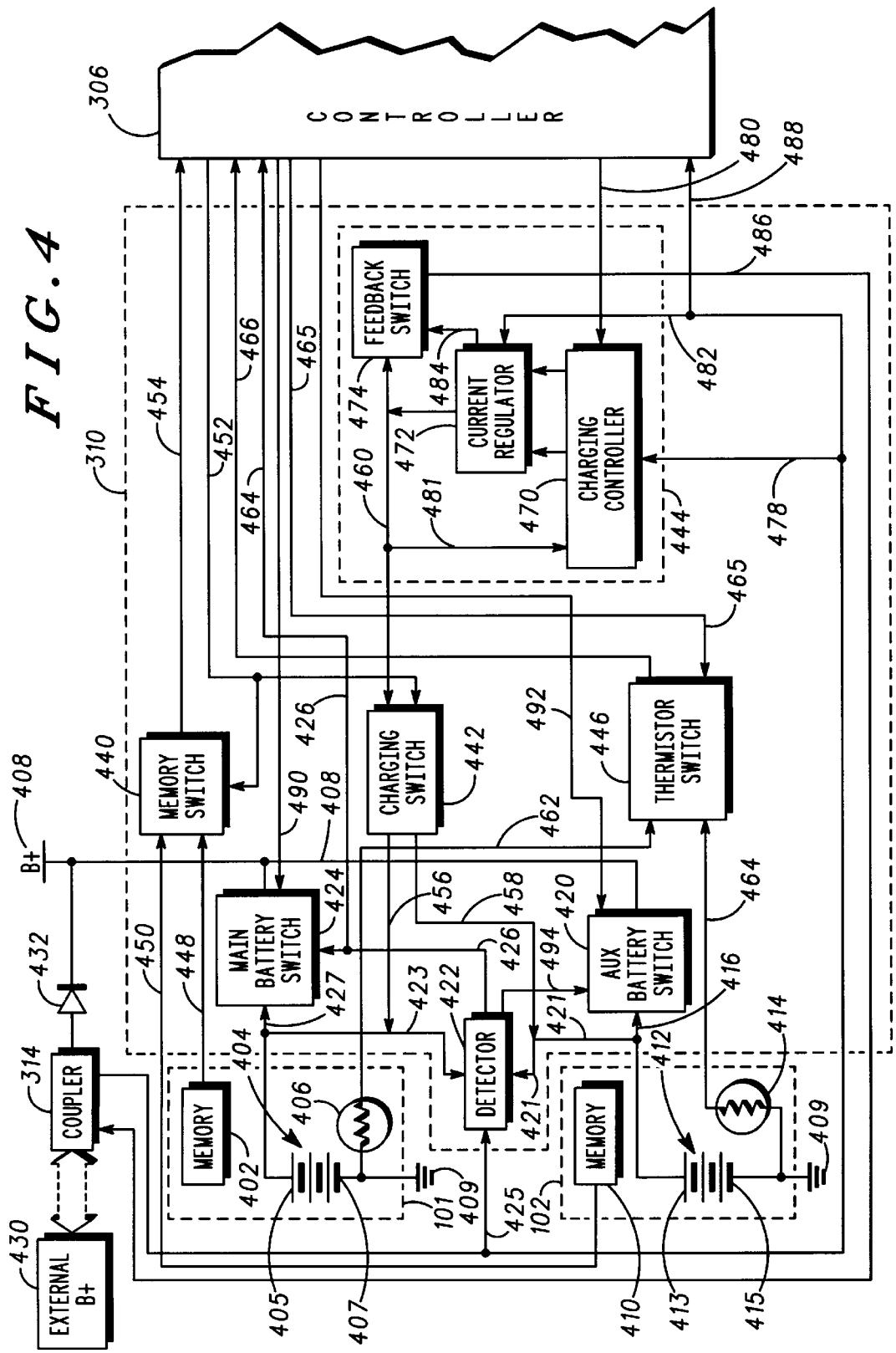
FIG. 4 is an illustration in block diagram form of the discharging and charging circuit of FIG. 3.

FIG. 4 is a block diagram showing the main battery 101, the supplemental module 102 configured as an auxiliary battery, the discharging and charging circuit 310, the coupler 314, and the controller 306. FIG. 4 illustrates charging and discharging of the main battery 101 and the auxiliary battery of the supplemental module 102. Thus, the supplemental module illustrated in FIG. 4 contains an auxiliary battery.

The main battery 101 and the supplemental module with the auxiliary battery are detachably coupled to the discharging and charging circuit 310. The main battery 101 includes a main electrochemical cell 404, a main memory 402, and a main thermistor 406. It will be recognized that the main electrochemical cell 404, as illustrated, represents one or more electrochemical cells. The main electrochemical cell 404 includes a main positive terminal 405 and a main negative terminal 407. The main electrochemical cell 404 is preferably rechargeable. The main electrochemical cell 404 is one of the following types: Nickel-Cadmium (NiCd), Nickel-Metal Hydride (NiMH), Alkaline, Lithium Ion or Lithium Polymer. Other battery types may be used. The main memory 402 is preferably an EPROM. The main memory 402 characterizes the main battery 101 as a "smart battery" because the main memory 402 stores data that may be used to optimize discharging and charging. Such data includes battery type data, discharge/charge hysteresis data, and history data. The main thermistor 406 is coupled to the main negative terminal 407 and indicates the temperature of the main electrochemical cell 404 via a voltage drop thereacross. The main negative terminal 407 is further coupled to an electrical ground 409.

The auxiliary battery is similar to the main battery 101 and includes an auxiliary memory 410, an auxiliary electrochemical cell 412 having an auxiliary positive terminal 413 and an auxiliary negative terminal 415, and an auxiliary thermistor 414. The auxiliary negative terminal 415 is similarly coupled to the electrical ground 409. In one embodiment, however, the auxiliary battery has a larger capacity than the main battery 101 and is capable of providing power for longer periods of time.

A discharging portion of the discharging and charging circuit 310 switchably connects the main battery 101 and the auxiliary battery to a device power supply line 408 (denoted as B+). The main battery 101 and the auxiliary battery of the supplemental module 102 typically supply the device power supply line 408 with a voltage between 2.8 V and 5.5 V. Other voltages are possible. For example, the main battery 101 or the auxiliary battery or both may be a "AAA" or "AA" cell powering the supply line with a voltage of approximately 1.5 V. The device power supply line 408 powers the controller 306, the receiver 304 of FIG. 3, the transmitter 305 of FIG. 3, the user interface of FIG. 3, and other components of the radiotelephone 100 via electrical connections. The discharging portion primarily includes an auxiliary battery switch 420, a detector 422, and a main battery switch 424. The auxiliary battery switch 420 is associated with the auxiliary battery and operates to connect the auxiliary battery to power the radiotelephone 100. An input of the auxiliary battery switch 420 is coupled to the auxiliary positive terminal 413 by line 416. An output of the auxiliary battery switch 420 is coupled to the device power supply line 408.

The detector 422 is coupled between the main battery 101 and the auxiliary battery and detects a battery discharge threshold for the first battery and a second battery discharge threshold for the second battery. The battery discharge threshold may be a battery output voltage, a state of charge of the battery or any other suitable battery characteristic. In the illustrated embodiment, the detector 422 detects when the auxiliary battery has discharged below a threshold level and when an external power supply 430 has been attached to the radiotelephone 100. In the preferred embodiment, the threshold voltage is 3.3 V, but any value suitable to the voltage provided by the batteries may be used. The main battery 101 and the auxiliary battery may provide different supply voltages. In that case, the controller 306 determines the battery type including its nominal output voltage for each battery. Under control of the controller 306, the detector 422 scales the input voltage received from the main battery 101 or the auxiliary battery of the supplemental module 102 to accommodate different types of batteries.

The auxiliary positive terminal 413 is coupled to a first input of the detector 422 via line 421. The main positive terminal 405 is coupled to a second input of the detector 422 via line 423. The coupler 314 is coupled to a third input of the detector 422 via line 425. An output of the detector 422 is coupled to the main battery switch 424 and the controller 306 via line 426.

The main battery switch 424, responsive to the detector 422 or the controller 306, connects or disconnects the main battery 101 as a power source from which the radiotelephone 100 can operate. A first input of the main battery switch 424 is coupled to the output of the detector 422 via line 426. A second input of the main battery switch 424 is coupled to the main positive terminal 405 via line 427. An output of the main battery switch 424 is coupled to the device power supply line 408.

The auxiliary battery switch 420, responsive to the detector 422 or the controller 306, connects or disconnects the auxiliary battery of the supplemental module 102 as a power source. A first input of the auxiliary battery switch 420 is coupled to the output of the detector via line 494. A second input of the auxiliary battery switch 420 is coupled to the auxiliary positive terminal 413 via line 416. An output of the auxiliary battery switch 420 is coupled to the device power supply line 408.

The controller 306 further couples the output of the detector 422 to the user interface 308 of FIG. 3. The user interface 308 interprets the output of the detector 422 and informs the user as to which of the main battery 101 and the auxiliary battery is powering the radiotelephone 100 at a particular time.

The discharging portion of the discharging and charging circuit 310 discharges the main battery 101 and the auxiliary battery according to a predetermined priority. In the illustrated embodiment, when both batteries are attached, the auxiliary battery is discharged first. Other priorities may be used. The auxiliary battery switch 420 initially couples the auxiliary positive terminal 413 to the device power supply line 408, thereby powering the radiotelephone 100 (FIG. 3) via the auxiliary battery. The detector 422 monitors the auxiliary electrochemical cell 412 while it discharges. When a voltage of the auxiliary positive terminal 413 falls below a threshold voltage, the detector 422 opens the auxiliary battery switch 420 and closes the main battery switch 424. This disconnects main power from the auxiliary battery switch 420 and connects the main positive terminal 405 to the device power supply line 408, thereby powering the radiotelephone 100 via the main battery 101.

While one battery is in-use, i.e., providing power, the other battery that is not in-use can be replaced (detached and re-attached) without interruption to the operation of the radiotelephone 100 (FIG. 3). While the auxiliary battery is in-use, the main battery 101 can be replaced. While the main battery 101 is in-use, the supplemental module 102 including the auxiliary battery can be replaced with a supplemental module including another auxiliary battery or with a supplemental module including a second RF communication circuit. Upon replacement of the supplemental module 102 including the auxiliary battery, the detector 422 opens the main battery switch 424 (and disconnects the main battery 101) if the voltage of the auxiliary positive terminal 413 is above the threshold voltage.

Also, the in-use battery can be detached without interrupting the operation of the radiotelephone 100. If the supplemental module 102 including the auxiliary battery is detached while in-use, the detector 422, responsive to the rapidly decreasing voltage on line 421, closes the main battery switch 424 quickly enough to prevent interruption. Interruption is also prevented when the main battery 101 is detached while in-use, even after the auxiliary battery has already discharged to the threshold voltage. This is accomplished by setting the threshold voltage (e.g., 3.3 V) above a minimal voltage that is necessary to power the radiotelephone 100. In the preferred embodiment, the minimal voltage is 2.8 V. This voltage can change in response to the type of battery attached. Also, the auxiliary battery switch 420 remains closed even after the auxiliary battery has discharged to the threshold voltage. Therefore, upon detachment of the main battery 101 while in-use, the auxiliary battery is still able to provide enough power to operate the radiotelephone 100 (at least for a short time). Also, the detector opens the main battery switch 424 when the presence of the main positive terminal 405 is no longer detected at the second input thereof, and opens the auxiliary battery switch via line 494 when the auxiliary battery is depleted or removed.

Such detachment of the in-use battery is an advantageous feature to users who wish to replace the in-use battery or select a second RF communication circuit during a phone call without dropping the phone call. In the illustrated embodiment, the main battery 101 is smaller than the auxiliary battery (see FIGS. 1 and 2) and, thus, more portable. It is therefore envisioned that users will carry more main batteries than auxiliary batteries on their person. The ability to replace the main battery 101 while it is in-use in therefore advantageous. It is further envisioned that in an alternative embodiment, the main battery and the auxiliary battery will be approximately the same size and are therefore interchangeable. The ability to interchange main and auxiliary batteries reduces the need to carry more of one type of battery.

When an external power supply 430 (denoted as EXTERNAL B+) is attached to the coupler 314, the discharging of the main battery 101 or the auxiliary battery is stopped and the radiotelephone 100 is powered via the external power supply 430. The external power supply 430 supplies the device power supply line 408 with a voltage that is approximately 1.4 V higher than the voltage provided by the main battery 101 and the auxiliary battery. Upon attachment, diode 432, which is coupled between the coupler 314 and the device power supply line 408, becomes forward biased and couples the voltage supplied by the external power supply 430 to the device power supply line 408 When the external power supply 430 is not attached, diode 432 prevents the main battery 101 and the auxiliary battery from draining back into the coupler 314. In response to the voltage on line 425, the detector 422 opens the main battery switch 424 and the auxiliary battery switch 420 discharging of the main battery 101 and the auxiliary battery stops. If the supplemental module 102 includes a second RF communication circuit, then the controller 306, via line 492, closes auxiliary battery switch 420 to allow the supplemental module including the second RF circuit to be powered from the external supply 430.

A charging portion of the discharging and charging circuit 310 selectively charges the main battery 101 and the auxiliary battery. The charging portion of the discharging and charging circuit 310 includes a memory switch 440, a charging switch 442, an internal charger 444, and a thermistor switch 446. The charging portion of the discharging and charging circuit 310 operates under the control of the controller 306.

The controller 306 selectively reads the contents of the main and auxiliary memories 402, 410 via the memory switch 440. The main memory 402 is coupled to a first input of the memory switch 440 via line 448. The auxiliary memory 410 is coupled to a second input of the memory switch 440 via line 450. The controller 306 is coupled to a third input of the memory switch 440 via line 452. The memory switch 440 includes an output that is coupled to the controller 306 via line 454. The controller 306 signals the memory switch 440 via line 452 to connect either the main memory 402 or the auxiliary memory 410 to the controller 306 via the output of the memory switch 440 and line 454. Once the connection is established, the controller 306 reads the battery data.

The controller 306 selects either the main battery 101 or the auxiliary battery to charge via the charging switch 442. The charging switch 442 includes a first output that is coupled to the main electrochemical cell 404 via line 456. The charging switch 442 includes a second output that is coupled to the auxiliary electrochemical cell 412 via line 458. The internal charger 444 is coupled to a first input of the charging switch 442 via line 460. The controller 306 is coupled to a second input of the charging switch 442 via line 452. The controller 306 signals the charging switch 442 via line 452 to connect the internal charger 444 via the first input of the charging switch and line 460 to either the main electrochemical cell 404 or the auxiliary electrochemical cell 412. Once connected a charging current provided by the internal charger 444 charges the main electrochemical cell 404 or the auxiliary electrochemical cell 412.

The controller 306 forms a detector for identifying a battery type of the main battery and the second battery. The battery type may be indicated by the thermistor of the battery, an output voltage of the battery or by any other suitable means. In the illustrated embodiment, the controller 306 may determine the presence of the main battery 101 and the auxiliary battery via the thermistor switch 446. The main thermistor 406 is coupled to a first input of the thermistor switch 446 via line 462. The auxiliary thermistor 414 is coupled to a second input of the thermistor switch 446 via line 464. The controller 306 is coupled to a third input of the thermistor switch 446 via line 465. The thermistor switch 446 includes an output that is coupled to the controller 306 via line 466. The controller 306 signals the thermistor switch 446 via line 465 to connect either the main thermistor 406 or the auxiliary thermistor 414 to the controller 306 via the output of the thermistor switch and line 466. Once connected, the controller 306 determines the presence of the main battery 101 or the auxiliary battery by a voltage drop across the respective thermistor.

The internal charger 444 includes a charging controller 470, a current regulator 472, and a feedback switch 474. The charging controller 470 is coupled to the coupler 314 via line 478, the controller 306 via line 480, and the charging current via line 481. The charging controller 470 responsive to the coupler 314, the controller 306, and the charging current, outputs a current signal to the current regulator 472. Besides having inputs for receiving the current from the charging controller 470, the current regulator 472 includes an input that is coupled to the coupler 314 via line 482. The current regulator 472, responsive to the current, outputs the charging current at a first or second rate to the charging switch 442 via line 460. Upon outputting the charging current, the current regulator 472 closes the feedback switch 474 via line 484. The feedback switch 474, once closed, couples the charging voltage on line 460 to the coupler 314 via line 486. The charging voltage is used for tracking by the external power supply 430.

The charging portion of the discharging and charging circuit 310 charges the main battery 101 and auxiliary batteries according to a predetermined priority. When both batteries are attached, the main battery 101 is charged first. Charging is commenced upon attachment of an external power source capable of charging batteries, such as the external power supply 430, to the coupler 314. The controller 306, sensing attachment of the external power supply 430 via line 488, switches between the main and auxiliary thermistors 406, 414 via the thermistor switch 446 to determine which batteries are present. If both the main battery 101 and the auxiliary batteries are attached, the controller 306 switches the memory switch 440 and reads the data from the main memory 402 via line 454. The external power supply 430 feeds the charging controller 470 via line 478. The controller 306 configures the charging controller 470 via line 480 so that the charging controller 470 supplies a current signal in accordance with the data read from the main battery 101. Feedback is provided on line 481 so that to the charging controller 470 can adjust the current signal, if necessary. The current regulator 472, responsive to the current signal from the charging controller 470, generates the charging current using the external power supply 430 provided via line 482. The current regulator 472 outputs the charging current to the charging switch 442 via line 460. The controller 306 switches the charging switch 442 to couple the charging current to the main electrochemical cell 404 via line 456. The main battery 101 is charged for a period according to charging data read from the main memory 402. After being charged for this period, the main battery 101 is deemed full.

Once the main battery 101 is fully charged, charging of the auxiliary battery is commenced. The controller 306 switches the memory switch 440 and reads battery data from the auxiliary memory 410. The controller 306 configures the internal charger 444 to output the charging current in accordance with the data read from the auxiliary battery. The controller 306 switches the charging switch 442 to couple the charging current to the auxiliary electrochemical cell 412 via line 452. The auxiliary battery is charged for a period according to optimum charging time data read from the auxiliary memory 410 and then deemed full. If the main battery 101 is replaced while the auxiliary battery is being charged, the controller 306 (which continually toggles the thermistor switch 446 between the main and auxiliary thermistors 406, 414 to determine battery presence during charging) interrupts charging of the auxiliary battery and commences charging of the main battery 101 in the aforementioned manner. Once both the main battery 101 and the auxiliary battery are fully charged, the internal charger 444 repeatedly applies a maintenance charge to each of the main battery 101 and the auxiliary battery for a period of approximately 1800 seconds. Maintenance charging consists of trickle charge or topping off to retard battery decay. Charging ends upon detachment of the external power supply 430.

Although the radiotelephone 100 includes an internal charger 444 for charging the multiple battery arrangement, it will be recognized that the charging means of the main battery 101 and the auxiliary battery could be external to the radiotelephone 100. For example, without the internal charger 444, charging of the main battery 101 and the auxiliary batteries could be accomplished via an external charger attached to the coupler 314. Aside from being coupled to the controller 306, the coupler 314 would also be coupled directly to the thermistor switch 446, the memory switch 440, and the charging switch 442. Upon attachment of the external charger, battery presence is determined via the thermistor switch 446, battery data is read from either the main memory 402 or auxiliary memory 410, and charging current based on the battery data is supplied to main battery 101 or the auxiliary battery via the charging switch 442.

FIG. 4 further illustrates circuitry for controlling battery discharging and charging and detection of the supplemental module 102. A control line 490 is provided between the controller 306 and the main battery switch 424 to override the main battery switch 424. Similarly, a control line 492 is provided between the controller 306 and the auxiliary battery switch 420 to override the auxiliary battery switch 420.

The controller 306 determines the nature of the supplemental module 102, either an auxiliary battery or an RF communication circuit. If the controller 306 determines that the supplemental module 102 includes an auxiliary battery, the detector 422 and internal charger 444 operate normally as described above. The detector 422 controls the main battery switch 424 and the auxiliary battery switch 420 to discharge and charge the main battery 101 and the auxiliary battery according to the predetermined priority. If the controller 306 determines that a supplemental module 102 containing a RF communication circuit is present, the controller will override the detector 422 and force the auxiliary battery switch 420 closed. This allows the RF communication circuit or other circuit in the supplemental module 102 to draw power from the device power supply line 408, labeled B+ in FIG. 4. If an external power supply 430 (denoted as EXTERNAL B+) is attached to the coupler 314, the controller overrides the main battery switch 424 to keep the main battery switch 424 open. If the external power supply 430 is not present, the controller 306 closes the main battery switch 424.

The controller 306 may determine that a supplemental module 102 including an RF communication circuit is present but that it is not desirable to operate the RF communication circuit. This option may occur if, for example, the communication system for which the RF communication circuit is designed to operate is not present, or to conserve battery power. In this case, the controller 306 overrides the auxiliary battery switch 420 to force the auxiliary battery switch 420 open. This interrupts supply of power to the supplemental module 102.

In an alternative embodiment, rather than controlling the main battery switch 424 and the auxiliary battery switch 420 directly, the detector 422 may be controlled by the controller 306. In this embodiment, the controller 306 controls the main battery switch 424 and the auxiliary battery switch 420 indirectly, through the detector 422. Such an implementation would increase the relative complexity of the detector 422.

Figure 5:
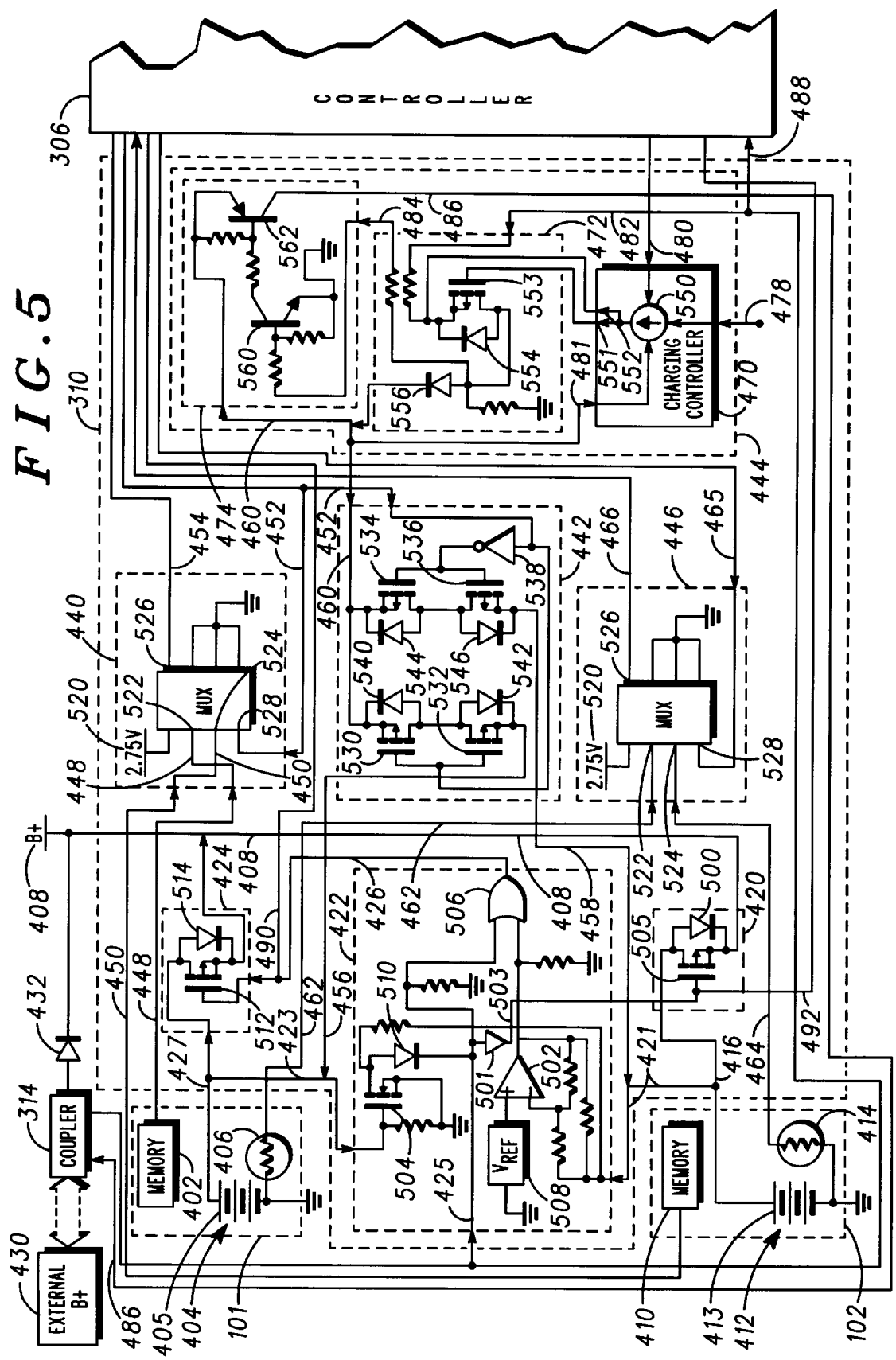
FIG. 5 is an illustration in partial schematic form of the discharging and charging circuit of FIG. 3.

FIG. 5 is an illustration in partial schematic form of the discharging and charging circuit 310. As stated, discharging the main battery 101 and the auxiliary battery is accomplished by the auxiliary battery switch 420, the detector 422, and the main battery switch 424.

The detector 422 primarily includes a comparator 502, transistor 504, diode 510, and an OR gate 506. The comparator 502 has a reference voltage 508 (denoted VREF) set to the threshold voltage of the auxiliary battery and coupled to a positive (+) terminal thereof. The auxiliary positive terminal 413 is coupled to a negative (−) terminal of the comparator 502 via line 421. The output of the comparator 502 is coupled to a first input of the OR gate 506. A gate of transistor 504, which is preferably an n-channel MOSFET, is coupled to the main positive terminal 405 via line 423. A drain of transistor 504 is coupled to the auxiliary positive terminal 413 and to a second input of the OR gate 506. Diode 510 is coupled between the drain of the transistor 504 and the OR gate 506. The second input of the OR gate 506 is also coupled to the coupler 314. The output of the OR gate 506 is coupled to the main battery switch 424 via line 426.

The main battery switch 424 includes transistor 512, which is preferably a p-channel enhancement mode MOSFET, and diode 514. A gate of transistor 512 is coupled to the output of the OR gate 506 via line 426. A drain of transistor 512 is coupled to the main positive terminal 405 via line 427. A source of transistor 512 is coupled to the device power supply line 408. Diode 514 is coupled between the source and drain of transistor 512.

The auxiliary battery switch 420 includes transistor 505 and diode 500. A gate of transistor 505 is coupled through a buffer 501 to line 425. A source of the transistor 505 is coupled to terminal 413 of the auxiliary battery and a drain of the transistor 505 is coupled to power supply line 408.

When the main battery 101 and the auxiliary battery are attached (and the external power supply 430 is not attached), auxiliary battery switch 420 closes and couples the auxiliary positive terminal 413 to the device power supply line 408. If the voltage level of the auxiliary positive terminal 413 is greater than or approximately equal to the reference voltage 508, the comparator 502 outputs a logic high signal. The reference voltage can be variable depending on the battery. For example, if the battery is a "AA" cell, the reference voltage is substantially 1.1 V. If the battery is a lithium ion battery, the reference voltage is substantially 3.0 V. The logic high signal causes the OR gate 506 to output a logic high signal on line 426. This, in turn, causes transistor 512 to turn off, thereby, preventing the main positive terminal 405 from supplying the device power supply line 408. Diode 514 prevents current from the device power supply line 408 from draining back and charging the main battery 101.

If the voltage level of the auxiliary positive terminal 413 falls below the reference voltage 508, the comparator 502 outputs a logic low signal to the OR gate 506. This causes the OR gate 506 to output a logic low signal on line 426. If both the main battery 101 and the auxiliary battery are still present, transistor 504 also outputs a logic low signal to the OR gate 506. This causes the OR gate 506 to output a logic low signal on line 426. And, in turn, causes transistor 512 to turn on and couple the main positive terminal 405 to the device power supply line 408.

If the main battery 101 is detached (and the auxiliary battery is attached), the gate of transistor 504 will no longer see, i.e., be supplied by, the main positive terminal 405. This results in the drain of transistor 504 being pulled high by the auxiliary positive terminal 413. This, in turn, causes the OR gate 506 to output the logic high signal on line 426 and transistor 512 to remain off.

When the external power supply 430 is attached to the coupler 314, the main battery 101 and the auxiliary battery stop discharging. Upon attachment, the presence of the external power supply 430 on line 425 causes the OR gate 506 to output the logic high signal on line 426. This causes transistor 512 to turn off. Diode 510 prevents current from the external power supply 430 from draining back and charging the main battery 101. If the supplemental module 102 includes an RF communication circuit (and if the external supply 430 is absent), the controller 306 closes the auxiliary battery switch 420 via line 492 and closes the main battery switch 424 via line 490.

As stated, to accomplish charging of the main battery 101 and the auxiliary battery the discharging and charging circuit 310 includes the memory switch 440; the charging switch 442; the charging controller 470, the current regulator 472, and the feedback switch 474 of the internal charger 444; and the thermistor switch 446. The memory and thermistor switches 440, 446 are preferably two channel multiplexer/demultiplexers that are powered by a 2.75 V supply 520. Each one of the memory and thermistor switches 440, 446 primarily includes first and second channel ports 522, 524 coupled to lines 448, 464 and lines 450, 462, respectively; a communication port 526 coupled to lines 454, 466; and a select port 528 coupled to lines 452, 465. A logic low signal coupled to the select port 528 from the controller 306 couples the first channel port 522 (connected to the main battery 101) to the communication port 526 and further on to the controller 306. A logic high signal coupled to the select port 528 from the controller 306 couples the second channel port 524 (connected to the auxiliary battery) to the communication port 526 and further on to the controller 306.

The charging switch 442 includes transistors 530, 532, 534, 536. Transistors 530, 532, 534, 536 are preferably p-channel enhancement mode MOSFETs. Gates of transistors 530, 532 are coupled to line 452. Gates of transistors 534, 536 are coupled to line 452 via an inverter gate 538. Sources of transistors 530, 534 are coupled to line 460. Sources of transistors 532, 536 are coupled to the main and auxiliary positive terminals 405, 413 via lines 456, 458, respectively. Drains of transistors 530, 532 are tied together. Drains of transistors 534, 536 are tied together. Diodes 540, 542, 544, 546 are coupled to transistors 530, 532, 534, 536, respectively, from drain to source. A logic low signal on line 452 switches on transistors 534, 536 so charging current on line 460 can flow to the main battery 101. A logic high signal on line 452 switches on transistors 530, 532 so charging current on line 460 can flow to the auxiliary battery. Diodes 540, 542, 544, 546 prevent the charging current from flowing to the battery not selected for charging.

The charging controller 470, which is preferably an integrated circuit, consists primarily of a controlled current source 550, such as a pulse width modulator (PWM), that generates an output current signal at a level determined by the charging controller 470. The current source 550 is fed by the coupler 314 via line 478 at a first input port, configured by the controller 306 via line 480 at a second input port, and adjusted via line 481 at a third input port. The charging controller 470 couples a current signal generated by the current source 550, responsive to the controller 306 and adjustments based on the feedback received via line 481, to the current regulator 472 via an output port 551 and a sense port 552.

The current regulator 472 includes primarily transistor 553, diode 554, and diode 556. Transistor 553 is preferably a p-channel enhancement mode MOSFET. A gate of transistor 553 is coupled to the output port 551 of the charging controller 470. A source of transistor 553 is coupled to the sense port 552 of the charging controller 470 and the coupler 314 (and the external power supply 430) via line 482. A drain of transistor 553 is output to the feedback switch 474 via line 484 and output to line 460 via diode 556. Transistor 553, responsive to the charging signal received from the output port 551 of the charging controller 470, turns on and couples current generated by the external power supply 430 and the current source 550 (the charging signal provided via the sense port 552 of the charging controller 470) to line 460 via diode 556. Diode 556 is preferably a Schottky rectifier. Diode 554 is coupled to transistor 553 from drain to source and prevents the charging current from flowing to line 460 when transistor 553 is off.

The feedback switch 474 primarily includes transistors 560, 562. Transistor 560, 562 are preferably bipolar junction transistors. Transistor 560 is an npn transistor. A base of transistor 560 is coupled to the current regulator 472 via line 484. A collector of transistor 560 is coupled to a base of transistor 562. Transistor 560 turns on responsive to the charging current generated by the current regulator 472. Transistor 562 is a pnp transistor. An emitter of transistor 562 is coupled to line 460. A collector of transistor 562 is coupled to the coupler 314 via line 486. Transistor 562 couples the charging voltage output by the current regulator 472 to the coupler 314 when transistor 560 is on. This allows the external power supply 430 to track the charging voltage.

Figure 6:
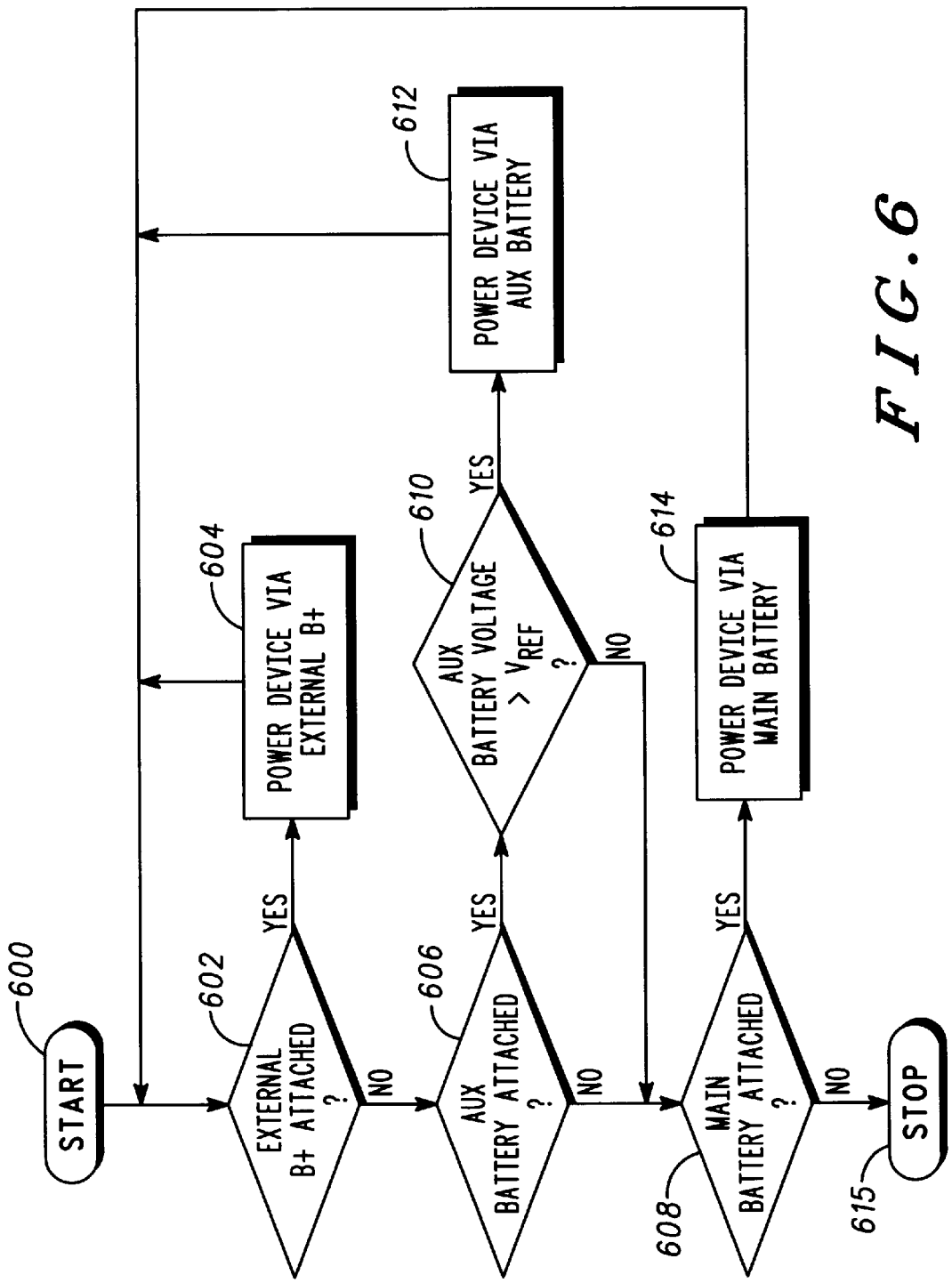
FIG. 6 is a flow diagram of a method of discharging the main battery and the auxiliary battery of the radiotelephone of FIG. 1.

FIG. 6 is a flow diagram illustrating a method of discharging the main battery 101 and the auxiliary battery of the supplemental module 102 illustrated in FIGS. 1–5. In the preferred embodiment, this method or process is implemented solely by the auxiliary battery switch 420, the detector 422, and the main battery switch 424 of the discharging and charging circuit 310 of FIGS. 4 and 5. It will be recognized, however, that this method may also be implemented by microprocessor or controller executed software program.

The process begins at block 600. At decision block 602, it is determined whether or not the external power supply 430 of FIGS. 4 and 5 is attached to the radiotelephone 100 of FIGS. 1–3. If the external power supply 430 is attached, the radiotelephone 100 is powered via the external power supply 430 at block 604 and the process is returned to decision block 602. If the external power supply 430 is not attached, the process proceeds to decision block 606.

At decision block 606, it is determined whether or not a supplemental module 102 including an auxiliary battery is attached to the radiotelephone 100. If the supplemental module 102 including the auxiliary battery is not attached, the process proceeds to decision block 608. If the auxiliary battery is attached, it is determined whether or not the voltage of the auxiliary battery is greater than the reference voltage 508 of FIG. 5 at decision block 610. If the voltage of the auxiliary battery is greater, the radiotelephone 100 is powered via the auxiliary battery at block 612 and the process is returned to decision block 602. If the voltage of the auxiliary battery is not greater, the process proceeds to decision block 608.

At decision block 608, it is determined whether or not the main battery 101 of FIGS. 1–5 is attached. If the main battery 101 is attached, the radiotelephone 100 is powered via the main battery 101 at block 614 and then the process is returned to decision block 602. If the main battery 101 is not attached, the process stops at block 615 because no power providing sources are attached to the radiotelephone 100.

Figure 7:
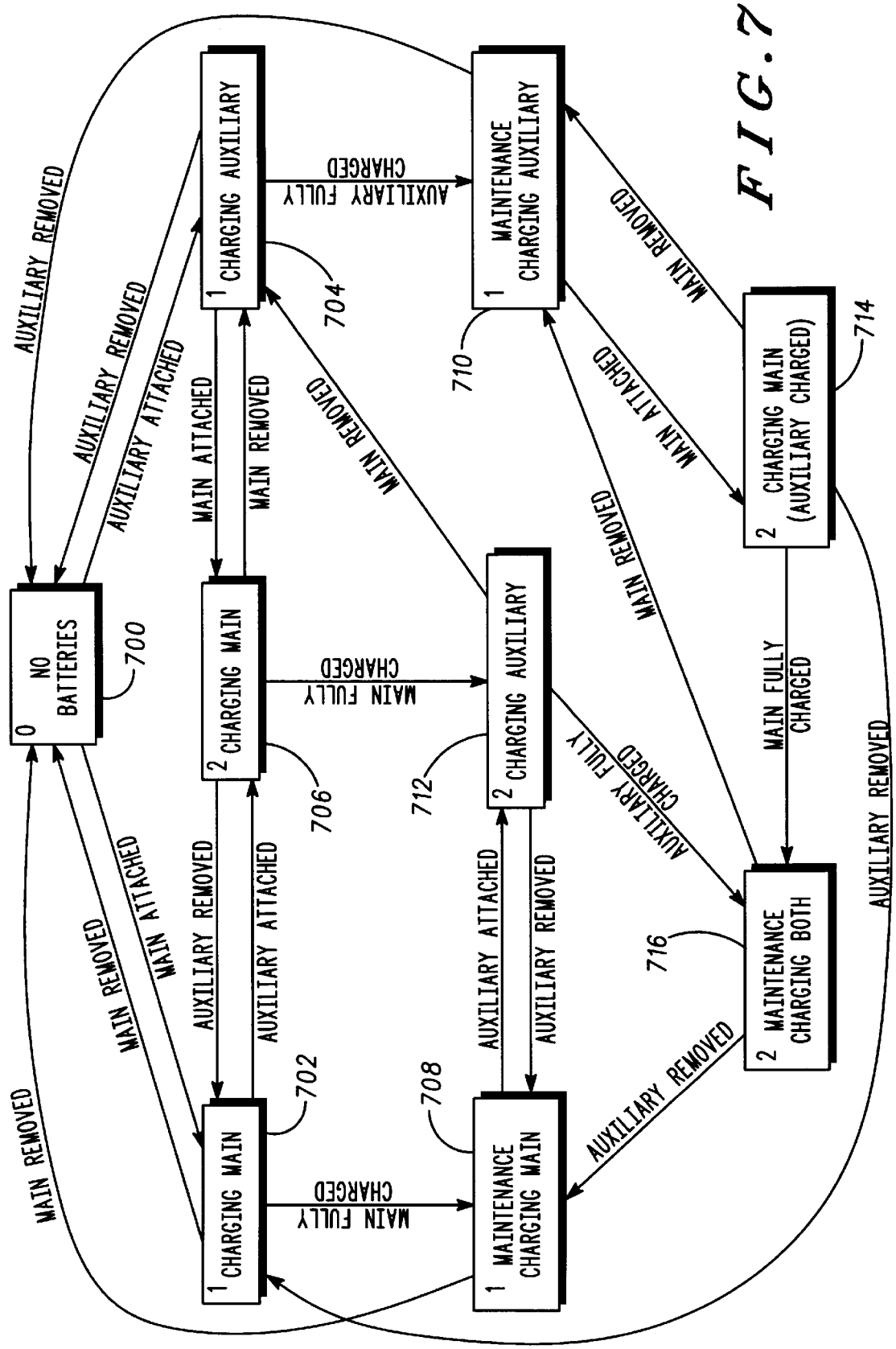
FIG. 7 is a state diagram showing a method of charging the main battery and the auxiliary battery of the radiotelephone of FIG. 1.

FIG. 7 is a state diagram showing a method of charging the main battery 101 and the auxiliary battery of FIGS. 1–5. In the preferred embodiment, this method or process is implemented using a software program executed by the controller 306 of FIGS. 3–5. In accordance with the program, the controller 306 operates the memory switch 440, the charging switch 442, the internal charger 444, and the thermistor switch 446 of the discharging and charging circuit 310 of FIGS. 4 and 5 to charge the main battery 101 and the auxiliary battery. It will be recognized, however, that this method may be implemented using only discrete hardware components. Each state is represented by a block. The number in the upper left corner of each of the blocks indicates the number of batteries attached to the radiotelephone 100 of FIGS. 1–3 during that state.

Block 700 indicates a state in which no batteries are attached. If the main battery 101 is attached to the radiotelephone 100 at block 700, the process moves to block 702. If the auxiliary battery is attached at block 700, the process moves to block 704.

Block 702 indicates a state in which only the main battery 101 is attached and charging. If the main battery 101 is removed at block 702, the process moves to block 700. If the auxiliary battery is attached at block 702, the process moves to block 706. If the main battery 101 becomes fully charged at block 702, the process moves to block 708.

Block 704 indicates a state in which only the auxiliary battery is attached and charging. If the auxiliary battery is removed at block 702, the process moves to block 700. If the main battery 101 is attached at block 704, the process moves to block 706. If the auxiliary battery becomes fully charged at block 704, the process moves to block 710.

Block 706 indicates a state in which both the main battery 101 and the auxiliary battery are attached and the main battery 101 is charging. If the main battery 101 is removed at block 706, the process moves to block 704. If the auxiliary battery is removed at block 706, the process moves to block 702. If the main battery 101 becomes fully charged at block 706, the process moves to block 712.

Block 708 indicates a state in which only the main battery 101 is attached and maintenance charging. If the main battery 101 is removed at block 708, the process moves to block 700. If the auxiliary battery is attached at block 708, the process moves to block 712.

Block 710 indicates a state in which only the auxiliary battery is attached and maintenance charging. If the auxiliary battery is removed at block 710, the process proceeds to block 700. If the main battery 101 is attached at block 710, the process proceeds to block 714.

Block 712 indicates a state in which both the main battery 101 and the auxiliary batteries are attached and the auxiliary battery is charging. If the main battery 101 is removed at block 712, the process proceeds to block 704. If the auxiliary battery is removed at block 712, the process moves to block 708. If the auxiliary battery becomes fully charged at block 712, the process moves to block 716.

Block 714 indicates a state in which both the main battery 101 and the auxiliary battery are attached, the main battery 101 is charging, and the auxiliary battery is fully charged. If the main battery 101 is removed at block 714, the process moves to block 710. If the auxiliary battery is removed at block 714, the process proceeds to block 702. If the main battery 101 becomes fully charged at block 714, the process moves to block 716.

Block 716 indicates a state in which both the main battery 101 and the auxiliary battery are attached and maintenance charging. If the main battery 101 is removed at block 716, the process proceeds to block 710. If the auxiliary battery is removed at block 716, the process proceeds to block 708.

Figure 8:
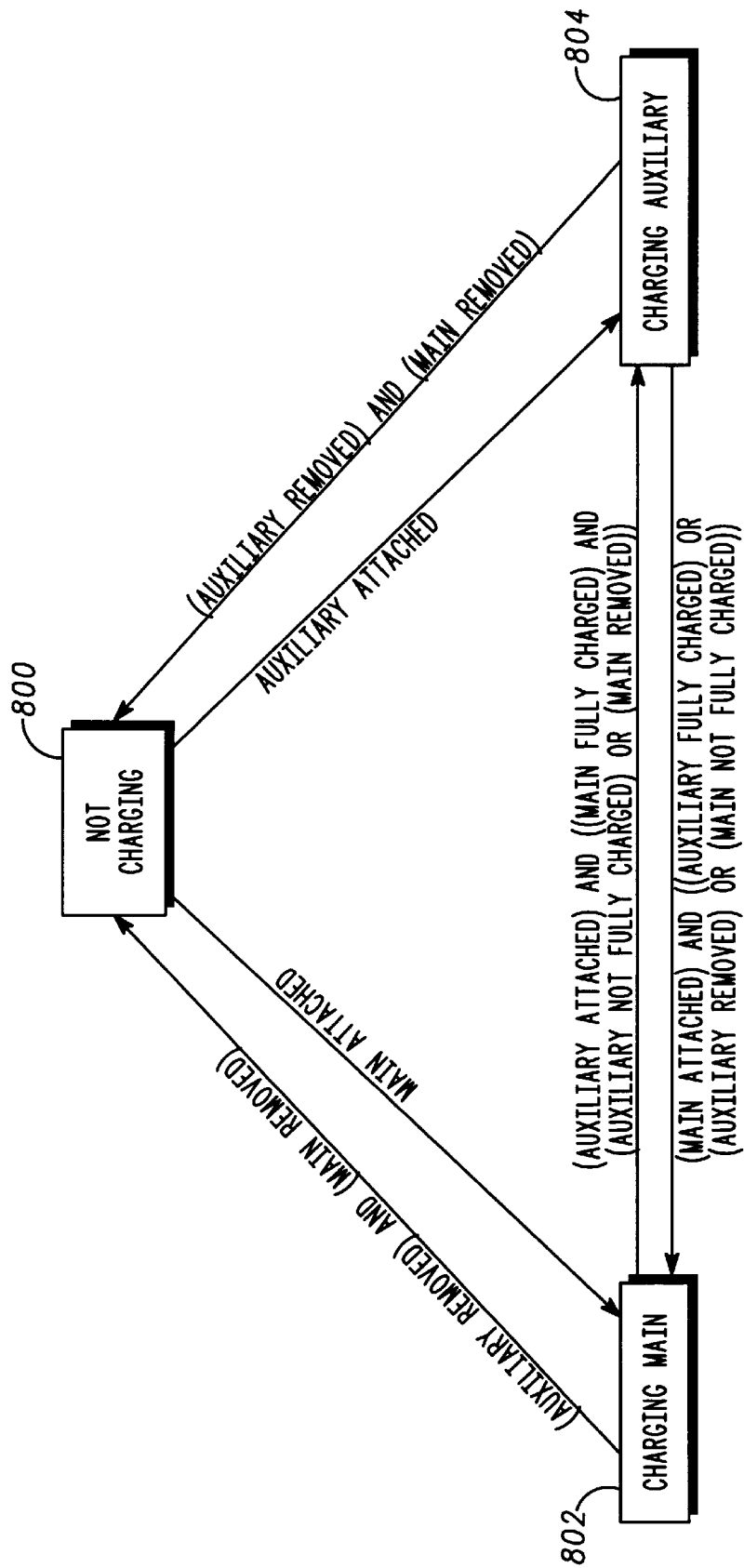
FIG. 8 is a state diagram showing a method of determining which one of the main battery and the auxiliary battery to charge.

FIG. 8 is a state diagram showing a method of determining which one of the main battery 101 and the auxiliary battery of a supplemental module 102 of FIGS. 1–5 to charge. This method is similar to that of FIG. 7 in that it is implemented using a software program executed by the controller 306 of FIGS. 3–5. In accordance with the program, the controller 306 operates the memory switch 440, the charging switch 442, the internal charger 444, and the thermistor switch 446 of the discharging and charging circuit 310 of FIGS. 4 and 5 to charge the main battery 101 and the auxiliary battery. This method, however, may be implemented using only discrete hardware components. Each state is represented by a block.

Block 800 indicates a state in which neither the main battery 101 nor the auxiliary battery is charging. If the main battery 101 is attached at block 800, the process moves to block 802. If the auxiliary battery is attached at block 800, the process moves to block 804.

Block 802 indicates a state in which only the main battery 101 is charging. If the main battery 101 and the supplemental module 102 including the auxiliary battery are removed at block 802, the process proceeds to block 800. If the auxiliary battery is attached, the main battery 101 is fully charged, and the auxiliary battery is not fully charged at block 802, the process moves to block 804. If the auxiliary battery is attached and the main battery 101 is removed at block 802, the process also proceeds to block 804.

Block 804 indicates a state in which only the auxiliary battery is charging. If the main battery 101 and the auxiliary battery are removed at block 804, the process proceeds to block 800. If the main battery 101 is attached and not fully charged at block 804, the process proceeds to block 802.

Figure 10:
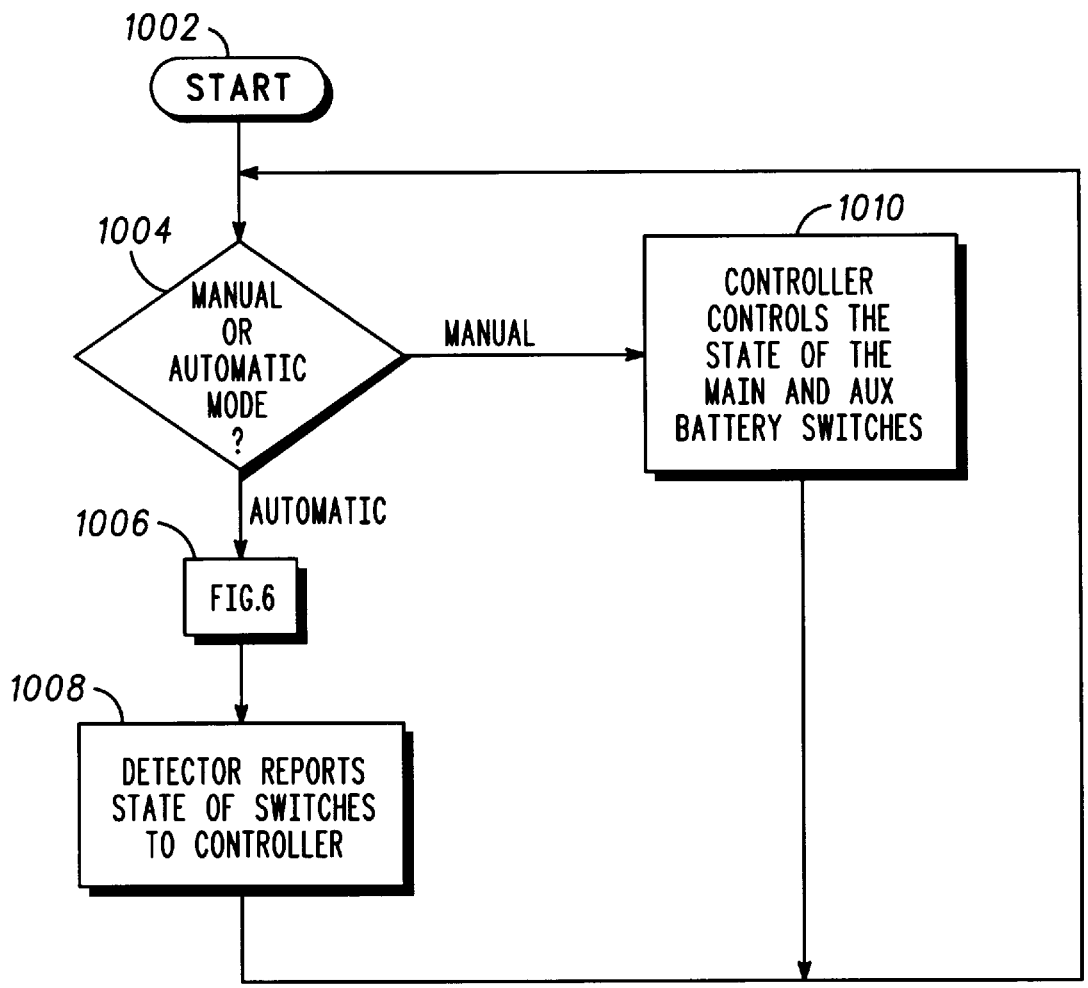
FIG. 10 is a flow diagram illustrating a method of multi-mode operation of the radiotelephone of FIG. 1 and FIG. 9.

FIG. 10 shows a flow diagram illustrating a method of multimode operation of the radiotelephone of FIG. 1 and FIG. 9. The method begins at step 1002. At step 1004, it is determined if the radiotelephone is operating in manual or automatic mode. In this context, manual mode corresponds to inclusion of a supplemental module including an RF communication circuit with the radiotelephone. Automatic mode corresponds to inclusion of a supplemental module including an auxiliary battery. Thus, the method detects the presence of a removable module and identifies the removable module as one of an auxiliary battery and a radio frequency (RF) communication circuit. If automatic mode is determined, control proceeds to step 1006 and the method illustrated in FIG. 6 is performed for discharging and charging the battery. The method selects one of the main battery and the auxiliary battery for powering the radiotelephone. At step 1008, the detector reports the state of the auxiliary battery switch and the main battery switch to the controller. Control then returns to the decision block, step 1004.

If manual mode was determined at step 1004, an RF communication circuit is present. In this mode, the controller of the radiotelephone will manually override the auxiliary battery switch and the main battery switch as appropriate to operate the RF communication circuit of the supplemental module. In step 1010, the controller controls the state of the two switches and operates the RF communication circuit of the supplemental module. Control then returns to the decision block, step 1004.

Each time step 1004 is performed, the controller of the radiotelephone determines if the operating mode of the radiotelephone has changed. For example, if at one time, a supplemental module including an auxiliary battery is included with the radiotelephone, automatic mode will be processed. If subsequently the supplemental module with the auxiliary battery is replaced with an auxiliary battery with a RF communication circuit, at step 1004 the method determines that manual mode should be entered and processing continues accordingly.

As can be seen from the foregoing, the present invention provides a radiotelephone and method for multi-mode operation. The radiotelephone includes a main battery and is operable on a first communication system. A supplemental module or cassette may be attached to the radiotelephone. The supplemental module may include a second RF communication circuit for communicating with a second communication system. This allows the user to configure the radiotelephone for communication with currently available systems. The supplemental module may further include an auxiliary battery for providing extended battery operation. The radiotelephone includes a discharging and charging circuit to control the discharge and charge of the auxiliary and main batteries in a way that allows uninterrupted, continuous operation of the radiotelephone. main battery.

While a particular embodiment of the present invention has been shown and described, modifications may be made. It is therefore intended in the appended claims to cover all such changes and modifications which fall within the true spirit and scope of the invention.

What is claimed is:

1. A method for operating a radiotelephone, the radiotelephone including a main battery, the method comprising the steps of:

detecting presence of a removable module;

identifying the removable module as one of an auxiliary battery and a radio frequency (RF) communication circuit;

if the removable module comprises the auxiliary battery, selecting one of the main battery and the auxiliary battery for powering the radiotelephone; and if the removable module comprises the RF communication circuit, operating the RF communication circuit.

2. A method for operating a radiotelephone as recited in claim 1 wherein the step of selecting comprises the step of detecting a battery identifier.

3. A method for operating a radiotelephone as recited in claim 2 wherein the battery identifier comprises a voltage.

* * * * *